US012786504B2

(12) United States Patent
Thomas

(10) Patent No.: US 12,786,504 B2
(45) Date of Patent: Nov. 3, 2026

(54) METHOD AND APPARATUS OF SIGNALING ENCAPSULATED DATA REPRESENTING PRIMARY VIDEO SEQUENCE ASSOCIATED WITH AUXILIARY VIDEO SEQUENCE, AND METHOD AND APPARATUS OF PARSING ENCAPSULATED DATA REPRESENTING PRIMARY VIDEO SEQUENCE ASSOCIATED WITH AUXILIARY VIDEO SEQUENCE

(71) Applicant: BEIJING XIAOMI MOBILE SOFTWARE CO., LTD., Beijing (CN)

(72) Inventor: Emmanuel Thomas, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 45 days.

(21) Appl. No.: 18/877,917

(22) PCT Filed: Apr. 24, 2023

(86) PCT No.: PCT/CN2023/090442
§ 371 (c)(1),
(2) Date: Dec. 20, 2024

(87) PCT Pub. No.: WO2023/246283
PCT Pub. Date: Dec. 28, 2023

(65) Prior Publication Data
US 2025/0373881 A1 Dec. 4, 2025

(30) Foreign Application Priority Data
Jun. 24, 2022 (EP) .................................... 22305922

(51) Int. Cl.
*H04N 21/431* (2011.01)

(52) U.S. Cl.
CPC .............................. *H04N 21/4316* (2013.01)

(58) Field of Classification Search
CPC ....... H04N 21/21805; H04N 21/23614; H04N 21/2362; H04N 21/42202; H04N 21/4316;
(Continued)

(56) References Cited

U.S. PATENT DOCUMENTS 4,570,232 A * 2/1986 Shikano .................. G10L 15/12 704/241
5,598,557 A * 1/1997 Doner ................. G06F 16/3346 707/999.005
(Continued)

FOREIGN PATENT DOCUMENTS

CN 101668219 A 3/2010
EP 2360930 A1 8/2011
(Continued)

OTHER PUBLICATIONS

ISO/IEC FDIS 23002-3-ISO_IEC_FDIS_23002-3_(E), Representation of auxiliary video and supplemental information, Dec. 30, 2010, 34 pages.
(Continued)

*Primary Examiner* — Michael B. Pierorazio
(74) *Attorney, Agent, or Firm* — Cozen O'Connor

(57) ABSTRACT

A method of signaling encapsulated data representing a primary video sequence associated with an auxiliary video sequence, the primary and auxiliary video sequences resulting from image projections methods applied on signals captured by sensors, includes: writing visual contents of the primary and auxiliary video sequences as encapsulated data; and writing an alignment status as encapsulated data, the alignment status indicating whether the visual contents of the primary and auxiliary video sequences are aligned.

20 Claims, 6 Drawing Sheets

(58) Field of Classification Search
CPC ........... H04N 21/4345; H04N 21/4348; H04N 21/816; H04N 21/85406
See application file for complete search history.

(56) References Cited

U.S. PATENT DOCUMENTS 6,085,160 A * 7/2000 D'hoore ................ G10L 15/005 704/277
6,442,518 B1 * 8/2002 Van Thong ............. G10L 15/26 704/235
6,473,778 B1 * 10/2002 Gibbon ................. G06F 40/103 715/201
7,035,468 B2 * 4/2006 Yogeshwar ............. G06F 16/71 707/E17.031
7,047,191 B2 * 5/2006 Lange ..................... G10L 15/26 704/235
7,065,524 B1 * 6/2006 Lee ........................ G16H 50/50 706/45
7,092,888 B1 * 8/2006 McCarthy ........... G10L 15/1822 704/277
7,110,664 B2 * 9/2006 Yogeshwar .............. H04N 5/76 386/328
7,509,385 B1 * 3/2009 Rittmeyer ............ G06Q 10/107 715/224
7,729,917 B2 * 6/2010 Miyamoto .............. G10L 15/22 704/275
7,739,253 B1 * 6/2010 Yanovsky ........... G06F 16/9535 707/706
7,801,910 B2 * 9/2010 Houh .................... G06F 16/583 707/765
7,908,628 B2 * 3/2011 Swart ................. H04N 21/6377 725/135
7,962,331 B2 * 6/2011 Miller ................... G10L 15/193 704/235
8,121,432 B2 * 2/2012 Dorai .................. G06F 16/7844 382/276
8,131,545 B1 * 3/2012 Moreno .................. G10L 15/04 704/235
8,209,724 B2 * 6/2012 Rathod .............. H04N 21/8405 348/715
8,248,528 B2 * 8/2012 Hosking ................ H04N 7/165 725/62
8,423,363 B2 * 4/2013 Gupta ..................... G10L 15/22 704/251
8,572,488 B2 * 10/2013 Phillips ................. G06F 3/0482 715/716
2002/0055950 A1 * 5/2002 Witteman ............... G06F 16/40 707/E17.009
2002/0093591 A1 * 7/2002 Gong ................. H04N 21/2368 348/E7.063
2003/0025832 A1 * 2/2003 Swart ................. H04N 21/4828 348/E7.071
2003/0061028 A1 * 3/2003 Dey ........................ G06F 16/40 704/9
2003/0169366 A1 * 9/2003 Lenzi ....................... H04N 7/10 348/461
2003/0206717 A1 * 11/2003 Yogeshwar ............ G11B 27/10 386/328
2004/0096110 A1 * 5/2004 Yogeshwar ............. G06F 16/51 707/E17.031
2005/0227614 A1 * 10/2005 Hosking ................ H04N 7/165 455/3.06
2006/0015339 A1 * 1/2006 Charlesworth ....... G10L 15/187 704/E15.02
2007/0124147 A1 * 5/2007 Gopinath ................ G10L 15/19 704/E15.021
2007/0124788 A1 * 5/2007 Wittkoter ............... H04N 7/165 348/E7.071
2007/0214164 A1 * 9/2007 MacLennan ............ G06F 16/90
2008/0066138 A1 * 3/2008 Bishop .................... G06F 40/58 725/137
2008/0255844 A1 * 10/2008 Wu ....................... G10L 15/193 704/E15.022
2008/0262996 A1 * 10/2008 Yogeshwar ............. G06F 16/71 707/E17.031
2008/0266449 A1 * 10/2008 Rathod ............... G06F 16/7867 348/E7.001
2008/0270134 A1 * 10/2008 Miyamoto ........... H04N 7/0885 348/E7.001
2009/0171662 A1 * 7/2009 Huang ................ G10L 15/1822 704/E15.041
2010/0091187 A1 * 4/2010 Topiwalla .......... H04N 21/4355 348/E7.003
2011/0022386 A1 * 1/2011 Gatzke .................... G10L 15/26 704/235
2011/0040559 A1 * 2/2011 Kim ...................... G10L 21/055 704/271
2011/0069230 A1 * 3/2011 Polumbus .......... H04N 21/4884 707/711
2011/0134321 A1 * 6/2011 Berry ............... H04N 21/43074 348/464
2011/0150101 A1 * 6/2011 Liu ...................... H04N 13/296 348/E13.001
2011/0202575 A1 * 8/2011 Frojdh ................. H04N 19/597 707/E17.028
2012/0101817 A1 * 4/2012 Mocenigo ............. G10L 15/063 704/E15.001
2012/0253799 A1 * 10/2012 Bangalore ............ G10L 15/183 704/E15.001
2013/0113996 A1 * 5/2013 Zhu .................... H04N 21/8543 348/565
2013/0254795 A1 * 9/2013 Botta ................. H04N 21/4542 725/28
2014/0259084 A1 * 9/2014 Polumbus ............. G06F 16/683 725/116
2016/0007054 A1 * 1/2016 Polumbus .............. G11B 27/10 725/116
2016/0014438 A1 * 1/2016 Xiong .............. H04N 21/23424 725/32
2016/0323590 A1 * 11/2016 Li ........................ H04N 19/172

FOREIGN PATENT DOCUMENTS

EP 2661090 A1 11/2013
WO WO 2008153294 A2 12/2008

OTHER PUBLICATIONS

European Patent Application No. 22305922.1, Search and Opinion dated Dec. 9, 2022, 12 pages.
PCT/CN2023/090442, International Search Report and Written Opinion dated Jul. 21, 2023, 8 pages.

* cited by examiner

| generic_params( ) { | Descriptor |
|---|---|
| aux_is_one_field | u(1) |
| if (aux_is_one_field) { | |
| aux_is_bottom_field | u(1) |
| } | |
| else { | |
| aux_is_interlaced | u(1) |
| } | |
| reserved_generic_bits | f(6) |
| position_offset_h | u(8) |
| position_offset_v | u(8) |
| } | |

| depth_params( ) { | Descriptor |
|---|---|
| nkfar | u(8) |
| nknear | u(8) |
| } | |

METHOD AND APPARATUS OF SIGNALING ENCAPSULATED DATA REPRESENTING PRIMARY VIDEO SEQUENCE ASSOCIATED WITH AUXILIARY VIDEO SEQUENCE, AND METHOD AND APPARATUS OF PARSING ENCAPSULATED DATA REPRESENTING PRIMARY VIDEO SEQUENCE ASSOCIATED WITH AUXILIARY VIDEO SEQUENCE

CROSS-REFERENCE TO RELATED APPLICATIONS

This application is the US national phase application of International Application No. PCT/CN2023/090442, filed on Apr. 24, 2023, which claims the benefit of priority to the European Patent Application No. 22305922.1, filed on Jun. 24, 2022, both of which are incorporated herein by reference in their entireties.

FIELD

The present disclosure generally relates to video encoders that encapsulate both visual contents and visual content descriptions.

BACKGROUND

Prior art does not allow an encapsulation of both primary and auxiliary video sequences wherein both primary and auxiliary video sequences may have different characteristics beyond spatial and temporal resolutions, such as projection and geometry characteristics, physical displacement, caused by the way the physical sensors are manufactured.

SUMMARY

According to a first aspect of the present disclosure, there is provided a method of signaling encapsulated data representing a primary video sequence associated with an auxiliary video sequence, the primary and auxiliary video sequences resulting from image projections methods applied on signals captured by sensors, the method comprising writing visual contents of the primary and auxiliary video sequences as encapsulated data; and writing an alignment status as encapsulated data, said alignment status indicating whether the visual contents of the primary and auxiliary video sequences are aligned.

According to a second aspect of the present disclosure, there is provided a method of parsing encapsulated data representing a primary video sequence associated with an auxiliary video sequence, the primary and auxiliary video sequences resulting from image projections methods applied on signals captured by sensors, the method comprising obtaining visual contents of the primary and auxiliary video sequences by parsing encapsulated data; and obtaining an alignment status by parsing encapsulated data, said alignment status indicating whether the visual contents of the primary and auxiliary video sequences are aligned.

According to a third aspect of the present disclosure, there is provided an apparatus of signaling encapsulated data representing a primary video sequence associated with an auxiliary video sequence, the primary and auxiliary video sequences resulting from image projections methods applied on signals captured by sensors. The apparatus includes a processor, and a memory storing instructions executable by the processor. The processor is configured to: write visual contents of the primary and auxiliary video sequences as encapsulated data; and write an alignment status as encapsulated data, said alignment status indicating whether the visual contents of the primary and auxiliary video sequences are aligned.

According to a fourth aspect of the present disclosure, there is provided an apparatus of parsing encapsulated data representing a primary video sequence associated with an auxiliary video sequence, the primary and auxiliary video sequences resulting from image projections methods applied on signals captured by sensors. The apparatus includes a processor, and a memory storing instructions executable by the processor. The processor is configured to perform the method described in the second aspect above.

The specific nature of at least one of the embodiments as well as other objects, advantages, features and uses of said at least one of embodiments will become even more apparent from the following description of examples taken in conjunction with the accompanying drawings.

BRIEF DESCRIPTION OF THE DRAWINGS

Reference will now be made, by way of example, to the accompanying drawings which show embodiments of the present disclosure.

DETAILED DESCRIPTION OF EMBODIMENTS

Figure 1:
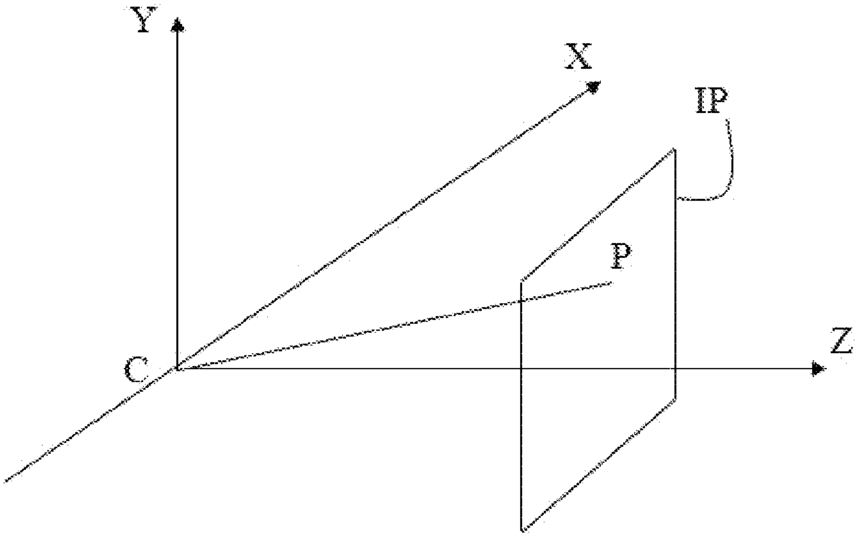
FIG. 1 shows schematically a geometrical representation of a depth information according to an embodiment of the present disclosure.

At least one of the embodiments is described more fully hereinafter with reference to the accompanying figures, in which examples of at least one of the embodiments are depicted. An embodiment may, however, be embodied in many alternate forms and should not be construed as limited to the examples set forth herein. Accordingly, it should be understood that there is no intent to limit embodiments to the particular forms disclosed. On the contrary, the present disclosure is intended to cover all modifications, equivalents, and alternatives falling within the spirit and scope of the present disclosure.

At least one of the aspects generally relates to signaling encapsulated data representing a primary video sequence associated with an auxiliary video sequence. One other aspect generally relates to producing/writing and possibly storing in a file or transmitting into a bitstream those encapsulated data and reading/accessing from a file or decoding from a bitstream those encapsulated data.

For facilitating a better understanding of various aspects of the present disclosure, various aspects of art that may be related to various aspects of embodiments of the present disclosure are introduced first. It should be understood that these statements are to be read in this light, and not as admissions of prior art.

A pixel corresponds to the smallest display unit on a screen, which can be composed of one or more sources of light (1 for monochrome screen or 3 or more for colour screens).

A video frame, also denoted image, comprises at least one component (also called channel) determined by a specific picture/video format which specifies all information relative to samples values and all information which may be used by a display unit and/or any other device to display and/or to decode video picture data related to said video frame in order to generate pixel values.

A video frame comprises at least one component usually expressed in the shape of an 2D array of samples.

A monochrome video frame comprises a single component and a color video frame (also denoted texture video frame) may comprise three components.

For example, a color video frame may comprise a luma (or luminance) component and two chroma components when the picture/video format is the well-known (Y,Cb,Cr) format or may comprise three color components (one for Red, one for Green and one for Blue) when the picture/video format is the well-known (R,G,B) format.

Each component of a video frame may comprise a number of samples relative to a number of pixels of a screen on which the video picture is intended to be display. For instance, the number of samples comprised in a component may be the same as, or a multiple (or fraction) of, a number of pixels of a screen on which the video frame is intended to be display.

The number of samples comprised in a component may also be a multiple (or fraction) of a number of samples comprised in another component of a same video frame.

For example, in the case of a video format comprising a luma component and two chroma components like the (Y,Cb,Cr) format, dependent on the color format considered, the chroma component may contain half the number of samples in width and/or height, relative to the luma component.

A sample is the smallest visual information unit of a component composing a video frame. A sample value may be, for example a luma or chroma value or a colour value of the red, green or blue component of a (R, G, B) format.

A pixel value of a screen may be represented by one sample for monochrome video picture and by multiple co-located samples for color video frame. Co-located samples associated with a pixel mean samples corresponding to the location of a pixel in the screen.

It is common to consider a video frame as being a set of pixel values, each pixel being represented by at least one sample.

The RGBD format associates a color image with a one-channel image coding on a certain bit depth the depth information for each corresponding pixel in the color image.

The same concept can be extended to video sequences wherein each image of a color video sequence is associated with a corresponding depth image of a depth video sequence.

A RGBD format is suited for encapsulating a primary video sequence and an associated auxiliary video sequence into a container for file-based storage or packet-based network transmission.

A primary video sequence may be a color video sequence i.e., samples of the primary video sequence represent pixel colors. But a primary video sequence may also be any other type of video sequence such as an infra-red video sequence, a reflectance video sequence, etc.

An auxiliary video sequence may be a depth video sequence, i.e. samples of the auxiliary video sequence represent depth information associated with samples of a primary video sequence. But an auxiliary video sequence may also be any other video sequence such as an infra-red video sequence, a reflectance video sequence, etc.

Depth information may follow different conventions but it typically represents the distance from a camera center C to a point P of a depth image plane IP along a direction given by a principal z-axis as illustrated on FIG. 1.

The RGBD format is a very interesting alternative to represent volumetric information as color and depth information compared to other alternative formats such as point clouds or mesh, because it has strong advantages when it comes to real-time (no sensor fusion, 3D reconstruction needed by intermediate node), low cost (depth sensor are quite pervasive) and distribution-friendliness (depth data can be carried as video which can leverage video encoders and decoders, especially in hardware, as well as widely deployed packaging and streaming format similar to 2D video streaming).

The RGBD format may be used in several applications such as "holographic" call that provides ability for a user to see another person as a volumetric object and not as a flat image as conventionally experienced in popular video call applications.

Looking Glass Portrait is also an application in which the RGBD format is quite suited since this device features a depth camera sensor coupled to a conventional camera. Yet another example is AR glasses with 6DoF capability which blends the remote participant in the real scene of the receiving user.

The RGBD format may also be well-suited for remote rendering of complex 3D objects in complex applications such as architecture or mechanical design in which 3D objects may quickly surpass the capacity of the local computer. One solution is to rely on lightweight workstations connected to a network node rendering the complex objects. The result of the rendering for a current perspective of a user may be streamed in a video stream following the RGBD format. This allows volumetric rendering of the object on the user's side while the rendering effectively happens remotely. This is typically relevant when the user wears a VR or AR HMD but can equally be applied with a flat screen setup on the user side.

From a RGBD formatted video sequence, it is indeed possible to create a stereo view from it, that is a view for the left eye (primary video sequence) and a view for the right eye (auxiliary video sequence) of an end-user. This process is possible to the extent the occlusion in the scene from the two left and right eye point of views is minimum. When occlusion occurs, there exist several techniques in the field (in-painting, AI based generation, patch texture delivery) to visually repair those area were no visual information is available, i.e. those occluded area. Note that some services may also decide to stream back to the user the left and right view right away. However, this would mean that the inter-view distance would be baked in and targeted for this user and its device which requires more negotiation and per-device adaptation on the rendering node which hinders mass distribution of the same content to thousands of users. Providing a RGBD formatted video sequence allows to be more device agnostic since the left and right view (in case of stereoscopic display, e.g. AR or VR HMD) would be generated on the user side based on the device characteristics and the inter-eye distance (also called interpupillary distance) of the user.

RGBD format may also be used in free viewpoint applications such as 3D TV for example. In a free viewpoint application, a user is able to choose a perspective from which to view a 3D scene. However, since the number of views is virtually infinite (user can choose any given perspective within a continuous range), this use case typically requires more than one input view of the 3D scene for better result. Nevertheless, the processing corresponding to synthesizing a view from a same input data has similarity with a 3D TV use case in which a receiver has to display to the user two views, one for left eye and one for the right eye. As a result, a basic processing on the device corresponds to synthesize at least one view (possibly two) from a RGBD format that may store a primary video sequence representing color information and an auxiliary video sequence representing depth information of the 3D scene.

Range imaging is the name for a collection of techniques that are used to produce a 2D image showing the distance to points in a real scene from a specific point, normally associated with some type of sensor device. The resulting range image, also known as a depth image, has pixel values (sample values) that correspond to this distance. If the sensor that is used to produce the depth image is properly calibrated the pixel values can be given directly in physical units, such as meters. There exist different sensor and techniques to generate depth images from sensed environment such as stereo triangulation, sheet of light triangulation, structured light, time-of-flight, interferometry or coded aperture (https://en.wikipedia.org/w/index.php?title=Range_imaging&oldid=1050828429 (accessed May 10, 2022)).

A depth video sequence captured from a real scene is usually decoupled from the capture of a color video sequence of the same scene. As a result, the visual contents of the captured depth and color video sequences cannot be aligned from the acquisition step. A visual content of video sequence is said aligned with the visual content of another video sequence when samples of video frames of said video sequence are aligned on samples of video frames of said another video sequence i.e. each of said samples of said video sequence corresponds to a sample of said another video sequence). A full alignment means that all samples of all video frames of the video sequence are aligned with the samples of the video frames of said another video sequence and the alignment is said partial when only some samples of video frames of the video sequence are aligned with samples of video frames of said another video sequence.

One of the reasons of a misalignment of samples of videos frames of a captured depth video sequence with samples of video frames of a captured color video sequence is that the captured depth video sequence can be of different spatial resolution, different frame rate (temporal sampling/resolution), temporally uncoherent (image taken at different points in time), compared to a captured color video sequence.

Another reason is that color and depth video sequences can be captured by different sensors not physically at the same location in space. Different imaging systems (lens systems) can also be used and/or different image projection methods (e.g. planar vs omnidirectional) used for projecting captured signals of the scene onto image plans of the sensors can bring different types of distortions on resulting depth and color images.

Figure 2:
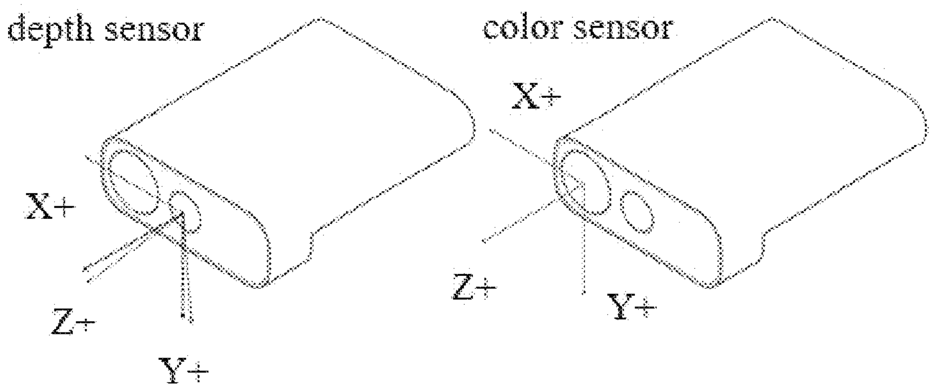
FIG. 2 shows schematically a schematic color and depth sensors according to an embodiment of the present disclosure.
Figures 3, 4:
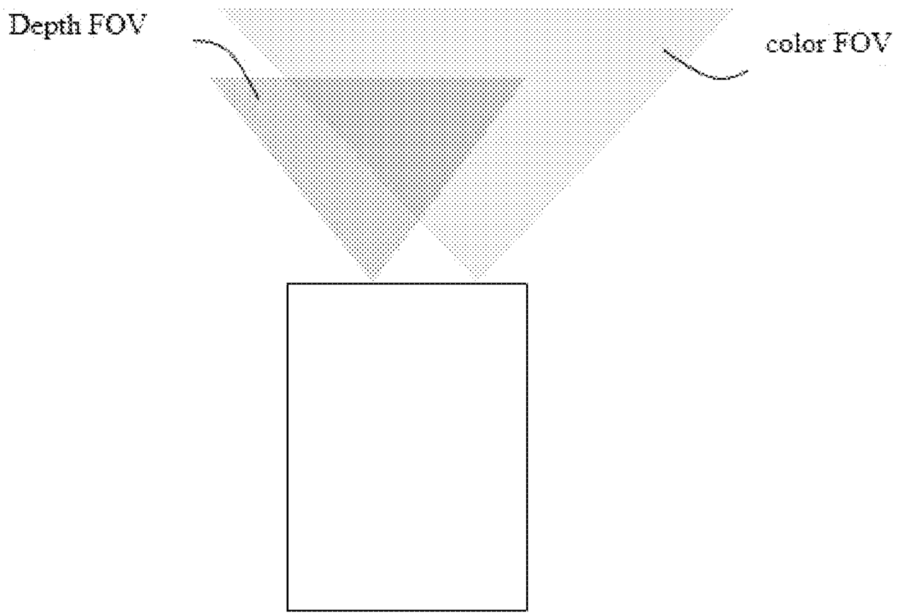
FIG. 3 shows fields of view of color and depth sensors according to an embodiment of the present disclosure.
FIG. 4 shows a syntax element "generic params" according to an embodiment of the present disclosure.

Some imaging system features both depth sensor as well as color sensor which are different and also spatially distant from each other as seen on FIG. 2. As a result, the images captured by those sensors do not represent exactly the same part of a real scene as can be seen on FIG. 3 where a sensor captures depth information (depth FOV) and a RGB camera captured a color information (color FOV). Since both images are captured from different sensors, the two images exhibit different characteristics. However, the application expects to be able to relate one pixel from the depth image to one pixel of the color image. As a result, the Kinect SDK also provides a transformation function (Use Azure Kinect Sensor SDK image transformations | Microsoft Docs, https://docs.microsoft.com/en-us/azure/kinect-dk/use-image-transformation) in order to convert either the color or the depth image to the other coordinate system.

The standard ISO/IEC 14496-12 (ISO/IEC 14496-12 Information technology-Coding of audio-visual objects-Part 12: ISO base media file format) defines a file format (ISOBMFF file structure) is useful for signaling both visual content and visual content descriptions of both primary and auxiliary video sequences.

Basically, the standard ISO/IEC 14496-12 forms so-called ISOBMFF (ISO Base Media File Format) files as a series of objects, called boxes. An example of boxes is a media box that contains video data. A media box contains a handler box that defines the nature of the data of a media box as defined in clause 8.4.3 of the standard.

The standard ISO/IEC 14496-12 allows to store multiple sequences of consecutives samples (audio sequences, video sequences, subtitles, etc.) into the so-called tracks which are differentiated by the media handler concept. A primary video track may use a 'vide' handler type in a handler box of a media box containing visual content data of a primary video sequence and an auxiliary video track may use a 'auxv' handler type in the handler box of another media box containing visual content data of an auxiliary video sequence data.

The auxiliary video track is coded the same as the primary video track, but uses a different handler type, and is not intended to be visually displayed as the video track would typically be.

When multiple tracks coexist in a same ISOBMFF file structure, it is useful to express their relationship such that the application can process them in the appropriate manner. For instance, two video tracks may be alternative from each other in which case, the application should only process and display one of the two tracks. In another scenario, an ISOBMFF file structure may contain one primary video track (e.g. color video sequence) and an auxiliary video track (e.g. depth video sequence). In this case, it may be implicit that the auxiliary video track complements the primary video track however, this implicit relationship breaks when there are multiple pairs of primary video sequence and auxiliary video sequence. For this reason and many others, the standard ISO/IEC 14496-12 provides the ability to link tracks to express a certain relationship thanks to a track referencing mechanism. This is a track-to-track signaling that may be realized by a particular box called TrackReferenceBox as defined in clause 8.3.3 of the standard ISO/IEC 14496-12.

In addition to the media handler and track reference concepts, the standard ISO/IEC 14496-12 allows to store metadata defined in the standard ISO/IEC 23002-2 (ISO/IEC 23002-3 Information technology-MPEG video technologies-Part 3: Representation of auxiliary video and supplemental information) as metadata item in a video track.

ISO/IEC 23002-3 is a standard that defines metadata to describe the characteristics of an auxiliary video sequence that complements a primary video sequence.

In the $1^{st}$ edition, published in 2007, the specification ISO/IEC 23002-3 defines metadata for two types of auxiliary video sequences: depth video sequence (depth map) and parallax video sequence (parallax map).

In brief, the standard ISO/IEC 23002-3 defines a syntax element "generic_params" allowing a precise alignment of an auxiliary video sequence with a primary video sequence (for instance in case of sub-sampling).

The syntax element "generic params" can be used with any type of auxiliary video sequence. As illustrated on FIG. 4, the syntax element "generic params" has provisions for signaling differences in progressive vs. interlaced, spatial resolution and temporal resolution between a primary video sequence and an auxiliary video sequence.

More precisely, the syntax element "generic params" contains a syntax element "aux_is_one_field" representing a Boolean value that is true (=1) to indicate that the auxiliary video sequence relates only to one field of the primary video sequence and is false (=0) to indicate that auxiliary video sequence relates to both fields of the primary video sequence.

The syntax element "generic params" contains a syntax element "aux_is_bottom_field" representing a Boolean value that is true (=1) to indicate the auxiliary video sequence corresponds only to the bottom field of the primary video sequence and is false (=0) to indicate the auxiliary video sequence corresponds only to the top field of the primary video sequence. If the syntax element "aux_is_one_field" is false, the syntax element "aux_is_bottom_field" is not applicable. The syntax element "generic params" also contains a syntax element "aux_is_interlaced" representing a Boolean value that is true to indicate that any spatial re-sampling operation on the auxiliary video sequence should be field-based and false to indicate that any spatial re-sampling operation on the auxiliary video sequence should be frame-based. If the syntax element "aux_is_one_field" is true, the syntax element "aux_is_interlaced" is inferred to be true.

The syntax element "generic params" also contains syntax elements "position_offset_h" and "position_offset_v" that respectively represent horizontal and vertical position offsets of the auxiliary video sequence data expressed in $1/16^{th}$ sample position in the primary video spatial sampling grid. The latter grid is that of video frames of primary video sequences if the syntax element "primary_is_interlaced" is false, that of field of video frames of primary video sequences if the syntax element "primary_is_interlaced" is true.

Figures 5, 6:
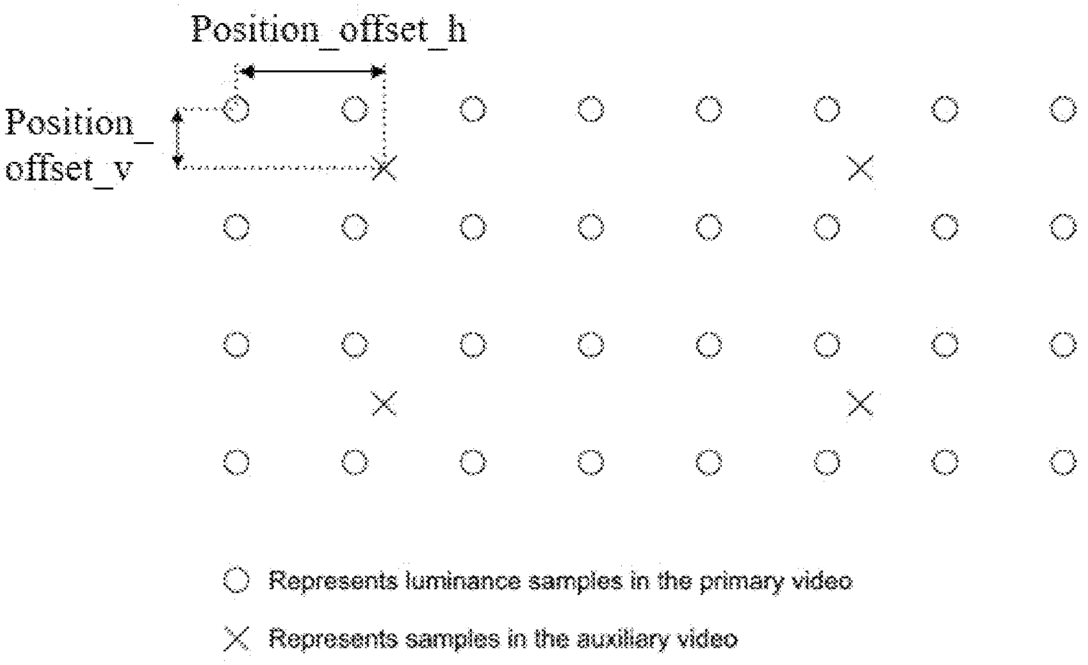
FIG. 5 shows position offsets between a primary video sequence data and an auxiliary video sequence data according to an embodiment of the present disclosure.
FIG. 6 shows a syntax element "depth params" according to an embodiment of the present disclosure.

FIG. 5 shows position offsets between a primary video sequence data and an auxiliary video sequence data. The auxiliary video sequence data is sub-sampled by a factor of 4 horizontally and a factor of 2 vertically, compared to the spatial resolution of the primary video sequence. The offsets due to the sub-sampling correspond here to "position_offset_h"=20 and "position_offset_v"=8 (expressed in $1/16^{th}$ sample position, i.e. respectively 1.25 sample position and 0.5 sample position).

The syntax elements "position_offset_h" and "position_offset_v" are useful when an auxiliary video sequence has a lower spatial resolution than its primary video sequence, i.e. when a filtering and decimation process have been performed, causing shifting.

When the primary and the auxiliary video sequences don't have the same spatial resolution, the receiver is expected to perform an up-sampling operation ("Although the re-sampling process is voluntarily left open" according to ISO/IEC 23002-3). As a result, syntax elements "position_offset_h" and "position_offset_v" allow to map a sample of a video frame of an auxiliary video sequence to a sample of a video frame of a primary video sequence while the re-sampling process being unspecified different implementation may lead to different re-sampled mapped samples.

A bitstream compliant with the standard ISO/IEC 23002-3 should respect the following constraints:

If the auxiliary and the primary video sequences have the same width, then the syntax element "position_offset_h" should be zero;

If syntax element "aux_is_one_field" is false, and if the auxiliary and the primary video sequences have the same height, then the syntax element "position_offset_v" should be set to zero; If syntax element "aux_is_one_field" is true, and if the auxiliary video sequence have half the height of the primary video sequence, then syntax element "position_offset_v" should be set to zero.

The standard ISO/IEC 23002-3 also defines a syntax element of "depth params" as illustrated on FIG. 6.

The syntax element "depth_params" contains a syntax element "nkfar" representing a parameter kfar, which is inferred as follows:

$$kfar = \frac{nkfar}{16}$$

and a syntax element "nknear" representing a parameter knear, which is inferred as follows:

$$knear = \frac{nknear}{64}$$

A depth value zp is represented by an unsigned N-bit value m. The depth value zp should non-normatively be inferred as follows:

$$z_p = \frac{m}{2^N}(knear \times W + kfar \times W) - kfar \times W$$

kfar and knear specify the range of the depth information respectively behind and in front of the image relatively to W.

W represents the screen width at the receiver side. W and zp are expressed using the same distance units. W is receiver-dependent and can also be viewed as an arbitrary scaling control on the range of depth to be displayed.

Negative (respectively positive) values of zp should correspond to a position behind a display respectively in front of the display). If zp equals zero, the corresponding position should be on the display.

In general it is recommended kfar has a greater value than knear, to accommodate the need for a depth range behind the image that is larger than the range in front of the image. For instance nkfar=128 and nknear=128 correspond to kfar=8 and knear=2.

In conclusion, the standard ISOBMFF does provide signaling that a track of a ISOBMFF file is an auxiliary video track to a primary video track wherein the auxiliary track may contain a depth video sequence.

The standard ISO/IEC 14496-12 in combination with ISO/IEC 23002-3 defines a storage file format for storing a primary video sequence along with an auxiliary video sequence wherein the auxiliary video data may be encoded with any compression schemes.

But the standard ISO/IEC 14496-12 in combination with ISO/IEC 23002-3 have drawbacks.

One of those drawbacks is about signaling position offsets (syntax elements “position_offset_h” and “position_offset_v”). Signaling position offsets is merely allowing variations in spatial resolution but the standard ISO/IEC 14496-12 in combination with ISO/IEC 23002-3 does not provide any solution when primary and auxiliary video sequences are not projection-aligned, i.e. the primary and auxiliary video sequence are the result of different image projections methods. The standard ISO/IEC 14496-12 in combination with ISO/IEC 23002-3 assumes that the primary and auxiliary video sequences are always projection-aligned, i.e. a same image projection method is used.

Another drawback is that the standard ISO/IEC 14496-12 in combination with ISO/IEC 23002-3 does not specify how to precisely generate correct samples of auxiliary video sequence (e.g. depth samples), when primary and auxiliary video sequences have not the same spatial resolution since re-sampling operation is unspecified.

In brief, prior art does not allow an encapsulation of both primary and auxiliary video sequences wherein both primary and auxiliary video sequences may have different characteristics beyond spatial and temporal resolutions, such as projection and geometry characteristics, physical displacement, caused by the way the physical sensors are manufactured.

At least one embodiment of the present disclosure has been devised with the foregoing in mind.

In the following, embodiments of the present disclosure are discussed by considering a primary video sequence as being a color video sequence and an associated auxiliary video sequence as being a depth video sequence because this is a usual association between primary and auxiliary video sequences. However, the present disclosure may extend to any other types of primary and auxiliary video sequences.

Encapsulation is a process of wrapping media representation within a container. Binary structures such as binary files (e.g. ISOBMFF files) are one instantiation of a container. Binary files define the syntax for parsing and understanding the structures of files. They have a start and an end and typically holds self-contained information. Binary files are generally transported and stored as a whole. However, binary files may be further segmented into smaller file units for the purpose of transmission over a network such as using HTTP-based transport. Popular standards for HTTP-based streaming are Apple HTTP Live Streaming (IETF Internet draft) and MPEG-DASH (Dynamic Adaptive Streaming over HTTP, ISO/IEC 23009-1).

When transmitting media data, a real-time protocol may also be chosen in order to meet the requirement of a targeted application. This is the case for instance for video conversional applications. In this case, the primary and auxiliary video sequence bitstreams are typically encapsulated into transport packets (containers) and not as a file structure. For example, Real-time Transport Protocol (RTP) (RFC 3550) could be used. But other transport packet encapsulation may be used without any limit of the scope of the present disclosure. A container may then be a bitstream, a network packet or a binary file.

In the following, embodiments of the present disclosure are described by considering encapsulation of primary and auxiliary video sequences into a file based on an instantiation of a binary file, called ISOBMFF file as defined in the standard ISO/IEC 14496-12. But other file instantiation may be used without any limit of the scope of the present disclosure.

Moreover, embodiments of a transport packet encapsulation could also be deduced from the following described embodiments of a file encapsulation by considering a transport standard as instantiation of a transport packet encapsulation rather than the described file encapsulation.

The at least one embodiment may apply to pre-existing or future-developed, and extensions of standards and recommendations. Unless indicated otherwise, or technically precluded, the aspects described in the present disclosure may be used individually or in combination.

The principles of the present disclosure are to signal encapsulated data representing both visual contents and visual content descriptions of a primary video sequence and of an associated auxiliary video sequence such that the visual contents of said two video sequences can be compressed, stored and transmitted as efficiently possible based on their different signal characteristics while enabling, at a later stage, the processing for obtaining aligned visual contents from decoded video sequences based on the signaled encapsulated data.

The encapsulated data represents an alignment status indicating whether the visual contents of the primary and auxiliary video sequences are aligned.

In addition, the encapsulated data may represent an alignment reference data indicating either the samples of video frames of the auxiliary video sequence have been aligned with samples of video frames of the primary video sequence or inversely.

Also, the encapsulated data may represent an overlap status indicating whether the visual content of the primary and the visual content of the auxiliary video sequences fully overlap or if the overlap is partial.

The overlap status may also provide information for resampling samples of video frames of a video sequence.

The encapsulated data may also represent resampling data indicating how an application can re-sample the video frames of either the auxiliary or primary video sequence to the dimensions of the video frames of either the primary or auxiliary video sequence and which samples to be resampled.

Also, the encapsulated data may represent interpolation data indicating an interpolation method used to resampling samples of video frames of a video sequence or coefficients of a resampling filter to be applied to the samples of video frames of a video sequence.

It is thus no longer needed to store the visual contents of the primary and auxiliary video sequences in a same spatial resolution, same projection (re-aligned), and/or same frame rate (temporal frequency) etc. This way, this allows to choose a format that yields optimal performance in terms of quality vs bitrate performance ratio for each video sequence (depth and color video sequence for example) while enabling the re-alignment of the samples of the visual contents of the primary and auxiliary video sequences after decoding by an application receiving/reading the encapsulated data.

In addition, a sending device may more quickly provide a captured stream in real-time condition (lower computational cost) since the alignment of visual contents of the primary and auxiliary video sequences is no longer a prerequisite at the sending side but could be performed by an intermediate node entity, possibly having a higher computational capacity, or by the receiving device in the extreme case.

Figure 7:
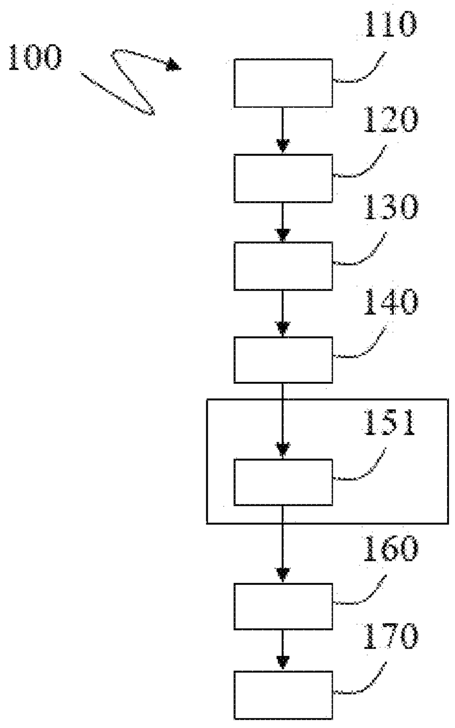
FIG. 7 shows a schematic block diagram of steps of a method of signaling encapsulated data representing a primary video sequence associated with an auxiliary video sequence in accordance with at least one embodiment of the present disclosure.

FIG. 7 shows a schematic block diagram of steps of a method 100 of signaling encapsulated data representing a primary video sequence V1 associated with an auxiliary video sequence V2 in accordance with at least one embodiment of the present disclosure.

A primary video sequence V1 is captured from a sensor. The sensor uses an imaging system based on a particular image projection method to produce video sequences from captured signals.

An auxiliary video sequence V2 is also captured from a sensor. The sensor uses an imaging system based on a particular image projection method to produce video sequences from captured signals.

In step 110, visual contents of the primary and auxiliary video sequences are written as encapsulated data.

In step 120, an alignment status is written as encapsulated data. The alignment status indicates whether the visual content of the primary and auxiliary video sequences V1 and V2 are aligned.

Signaling the alignment status is useful because according to its value processing should be applied or not on the primary and auxiliary video sequence carried by the encapsulated data.

Figure 8:
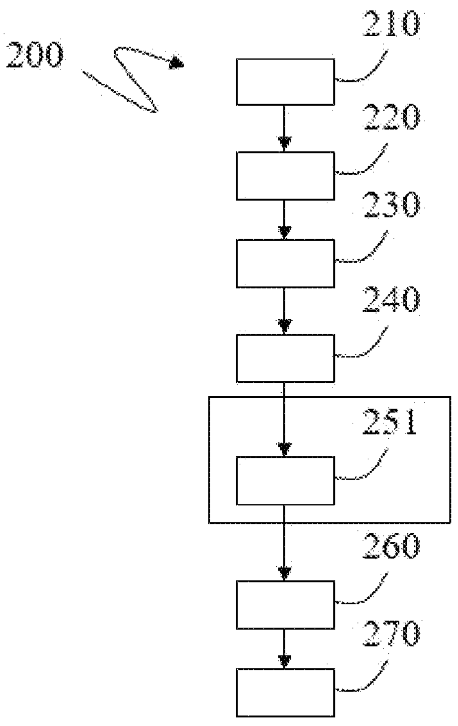
FIG. 8 shows a schematic block diagram of steps of a method of parsing encapsulated data representing a primary video sequence associated with an auxiliary video sequence in accordance with at least one embodiment of the present disclosure.

FIG. 8 shows a schematic block diagram of steps of a method 200 of parsing encapsulated data representing the primary video sequence V1 associated with the auxiliary video sequence V2 in accordance with at least one embodiment of the present disclosure.

In step 210, the visual contents of the primary and auxiliary video sequences are obtained by parsing encapsulated data.

In step 220, the alignment status is obtained by parsing encapsulated data. The alignment status indicates whether the visual content of the primary and auxiliary video sequences V1 and V2 are aligned.

In a variant of step 120 or 220, the alignment status further provides details about the alignment between the visual content of the primary video sequence and the visual content auxiliary video sequence.

In a variant, the alignment state

- equal 0 to specify that there is no alignment between the visual content of the primary video sequence and the visual content of the auxiliary video sequence;
- equal 1 to specify that the primary video sequence and the auxiliary video sequence have been produced from a same image projection method but samples of their video frames may not be aligned;
- equal 2 to specify that there is one-to-one alignment between the samples of video frames of the primary video sequence and the samples of the video frames of the auxiliary video sequence; or
- equal 3 to specify that alignment between the visual content of the primary video sequence and the visual content of the auxiliary video sequence is unspecified.

In a variant, when the alignment status equals to 1, the method 100 further comprises step 130 and the method 200 further comprises step 230.

In step 130, an alignment reference data is written as encapsulated data and in step 230, the alignment status is obtained by parsing encapsulated data. The alignment reference data indicates either the samples of video frames of the auxiliary video sequence were aligned with samples of video frames of the primary video sequence or inversely.

In a variant, the alignment reference data

- equal to 0 specifies that the samples of video frames of the auxiliary video sequence have been aligned with samples of video frames of the primary video sequence;
- equal to 1 specifies that the samples of video frames of the primary video sequence have been aligned with samples of video frames of the auxiliary video sequence;
- equal to 2 specifies that the reference for the alignment is unspecified.

In one embodiment, if the alignment status indicates that the primary and auxiliary video sequences are aligned, the method 100 further comprises step 140 and the method 200 further comprises step 240.

In step 140, an overlap status is written as encapsulated data and in step 240 an overlap status is obtained by parsing encapsulated data. The overlap status indicates whether the visual content of the primary and auxiliary video sequences fully overlap or if the overlap is partial.

Signaling the overlap status is useful because according to its value particular re-sampling processing can be applied or not on the primary video sequence or the auxiliary video sequence carried by the encapsulated data.

In one embodiment, the overlap status indicates:

- a first overlap window flag that indicates the presence of an explicit overlap window within the video frames of the auxiliary video sequence that align with the video frames of the primary video sequence; and
- a second overlap window flag that indicates the presence of an explicit overlap window within the video frames of the primary video sequence that align with the video frames of the auxiliary video sequence.

If the first or second overlap window flag indicates the presence of an explicit overlap window then the overlap status further indicates:

- a window horizontal position that specifies the horizontal position of the top left corner of the overlap window;
- a window vertical position that specifies the horizontal position of the top left corner of the overlap window;
- a window width that specifies the horizontal dimension the top left corner of the overlap window;
- a window height that specifies the horizontal dimension the top left corner of the overlap window;
- a window position horizontal offset that specifies a position horizontal offset, for example in $1/16^{th}$ of pixel unit, of the top left corner of the overlap window; and
- a window position vertical offset that specifies a position vertical offset, for example in $1/16^{th}$ of pixel unit, of the top left corner of the overlap window.

If the first and second overlap window flags indicate the presence of explicit overlap windows, the overlap status indicates a window horizontal position, a window vertical position, a window width, a window height, a window position horizontal offset and a window position vertical offset for each overlap window.

When the alignment status indicates that the visual content of the primary and auxiliary video sequences are not aligned, is may be useful signaling how a receiving device (player) may be able to transform one video sequence, e.g. an auxiliary video sequence, such that the samples of video frames of said video sequence align with the samples of video frames of the other video sequence, e.g. the primary video sequence.

In one embodiment, the method 100 further comprises a step 150 and the method 200 further comprises a step 250.

When the primary and auxiliary video sequence have different dimensions or the overlap windows have different dimensions, in step 150 a resampling data is written as encapsulated data and in step 250 a resampling data is obtained by parsing encapsulated data. The resampling data indicates how an application can re-sample the video frames of either the auxiliary or primary video sequence to the dimensions of the video frames of either the primary or auxiliary video sequence and which samples to be resampled.

This way, the behavior of different players can be consistent across vendors and increase the consistency of the presented content.

In one embodiment, the resampling data:

- equal 0 to specify that the samples to be resampled are the samples of video frames of the auxiliary video sequence;
- equal 1 to specify that the samples to be resampled are the samples of the video frames of the primary video sequence;
- equal 2 to specify that the samples to be resampled are the samples of the video frames of the video sequence which dimension is the smallest between the primary and auxiliary video sequences;
- equal 3 to specify that samples to be resampled are the samples of the video frames of the video sequence which dimension is the largest between the primary video and auxiliary video sequence.

In a variant, step 150 comprises step 151 and step 250 comprises step 251.

In step 151, an interpolation data is written as encapsulated data and in step 251, an interpolation data is obtained by parsing encapsulated data. The interpolation data indicates an interpolation method used to resampling samples of video frames of a video sequence.

In one example embodiment, the interpolating data

- equal 0 specifies that the nearest neighbor interpolation method shall be used;
- equal 1 specifies that the bilinear interpolation shall be used.
- equal 2 specifies that the bicubic interpolation shall be used.
- equal 3 specifies that the Lanczos interpolation shall be used.

In one example embodiment, the interpolating data may represent coefficients of a resampling filter to be applied to the samples of video frames of a video sequence but the goal remains the same, that is to instruct the application to resample the samples of video frames of a video sequence according to a particular method.

When the alignment status indicates that the image projections methods used for capturing the primary video sequence V1 and the auxiliary video sequence V2 are different and/or when the viewpoints for capturing those video sequences are different, e.g. when the sensors are several millimeters apart or when the optic systems are different, it may be useful to provide what is commonly called intrinsic and extrinsic camera parameters. The intrinsic camera parameters describe the optical system of a camera that was used for generating a video sequence and the extrinsic camera parameters describe the position and orientation of the camera into a real scene. When only two camera are used, it can be sufficient to know the position and orientation of a camera with respect to the other camera. With both types of parameters for two cameras are known, it is mathematically possible to transform one video sequence of a scene captured by a first camera to another video sequence of the same scene as if it was taken by the other camera.

In this scenario, and to integrate more easily with available hardware, it may then be desirable to write a calibration file as encapsulated data. The calibration file contains intrinsic and extrinsic camera parameters of sensors used for capturing the primary and auxiliary video sequences. In one embodiment, the method 100 further comprises step 160 and the method 200 further comprises step 260.

In step 160, a calibration data is written as encapsulated data and in step 260 a calibration data is obtained by parsing encapsulated data. The calibration data specifies a calibration file in terms of formatting (e.g. JSON, XML, etc.) as well as content wise (i.e. to which schema, and associated specification, it complies to) and contains a string representing the calibration file or a binary structure representing the calibration data parameters.

In one embodiment, the calibration data contains binary data representing the calibration file and a parameter that specifies the length of the file containing the encapsulated data, e.g. the length of the ISOBMFF file, before the position of the calibration file itself in the box syntax.

When both the primary and auxiliary video sequences are encapsulated, it is desirable for distribution and for an application to be able to identify quickly the nature of the encapsulated data without having to parse a significant amount of data. Among other use, this can allow content selection by a streaming client when parsing a manifest file, such as the Media Presentation Document (MPD) defined by the MPEG-DASH standard, wherein a high-level information about the nature of the media data is signaled.

In one embodiment, the method 100 further comprises step 170 and the method 200 further comprises step 270.

In step 170, a code is written as encapsulated data and in step 270, a code is obtained by parsing encapsulated data. The code defines a brand for identifying the file as containing a media content and a descriptive metadata pertaining to a primary video sequence associated with an auxiliary video sequence.

For example, a four characters code, for instance 'rgbd', is written as encapsulated data.

In one embodiment in method 100, the encapsulated data is written into a binary file and in method 200 a binary file is parsed.

Figure 9:
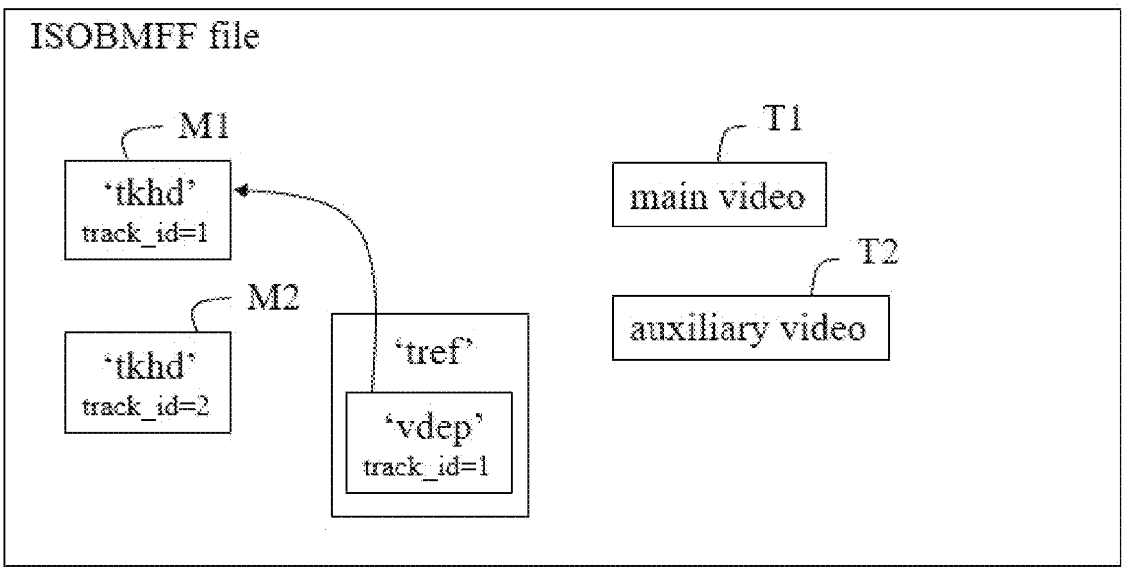
FIG. 9 shows an encapsulation of a single primary video sequence associated with a single auxiliary video sequence into an ISO base media file format (ISOBMFF) file in accordance with an embodiment of the present disclosure.
Figure 11:
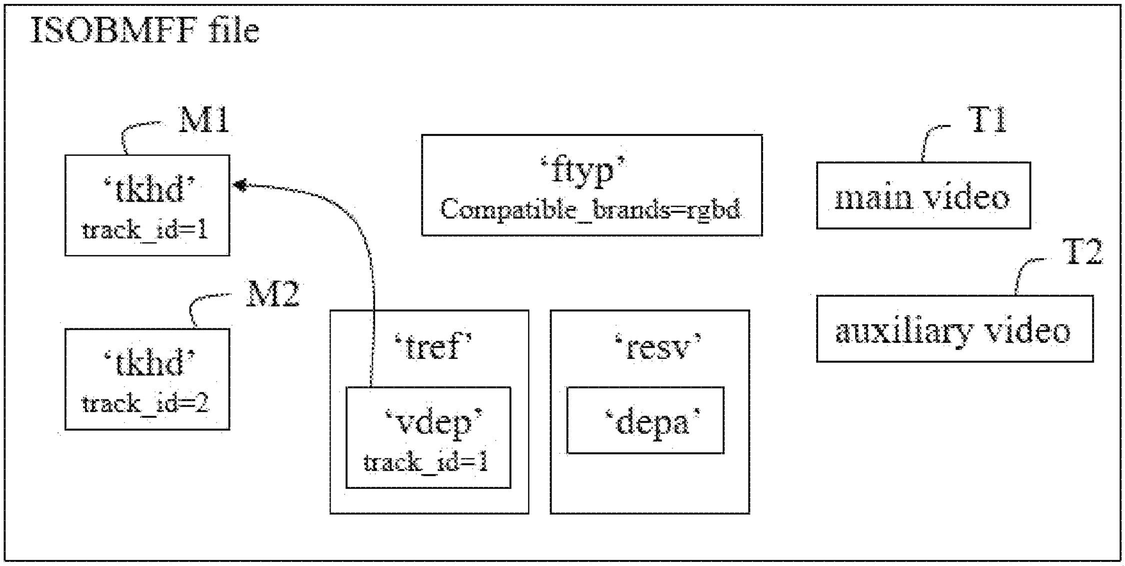
FIG. 11 shows an encapsulation of a single primary video sequence associated with a single auxiliary video sequence into an ISOBMFF file in accordance with an embodiment of the present disclosure.

For example, the binary file is a ISOBFMFF file that conforms with the standard ISO/IEC 14496-12 in combination with ISO/IEC 23002-3 as illustrated on FIGS. 9 and 11.

FIG. 9 shows an encapsulation of a single primary video sequence associated with a single auxiliary video sequence into a ISOBMFF file in accordance with an embodiment of the present disclosure.

The ISOBMFF file contains boxes as defined in the standard ISO/IEC 14496-12 as above discussed.

In steps 110 and 210, the visual content of the primary video sequence V1 is encapsulated as a primary video track T1 of the ISOBMFF file and the auxiliary video sequence V2 is encapsulated as an auxiliary video track T2.

Note that for the sake of simplicity, only the relevant boxes are represented on FIG. 9. A media data box stores data representing the visual content of the primary video track T1 corresponding to data representing the visual content of the video sequence V1 (main video) and a media data box stores data representing the visual content of the auxiliary video track corresponding to data representing the visual content of the video sequence V2 (auxiliary video). The boxes M1 and M2 represent visual content descriptions of the video sequences V1 and V2, i.e. metadata describing properties of the video sequences V1 and V2.

More specifically, in the ISOBMFF file of FIG. 9, the primary video track T1 is identified by an identifier track_ID=1 and the auxiliary video track T2 is identified by an identifier track_ID=2. These identifiers are signaled in a track header box 'tkhd'. The track referencing mechanism as defined in the standard is used to represent, in the ISOBMFF file, the association between the primary video sequence V1 and the auxiliary video sequence V2, i.e. between the primary video track T1 with the auxiliary video track T2.

For example, when the auxiliary video sequence V2 is a depth video sequence, a 'vdep' box, contained in a box called TrackReferenceBox 'tref' as defined in clause 8.3.3.2 of the standard ISO/IEC 14496-12, is used.

The 'vdep' box contains the identifier of the referenced track (here track_ID=1) which links the depth video track T2 with the primary video track T1.

In a variant, a single primary video sequence may be associated with multiple auxiliary video sequence into the ISOBMFF file.

The visual content of the primary video sequence is then encapsulated as a primary video track of the ISOBMFF file and each auxiliary video sequence is encapsulated as an auxiliary video track.

This can be the case, for example, when a color video sequence as a large field of view while depth video sequences have smaller fields of view which effectively means than the captured part of the scene of each depth video sequence overlaps partially with the whole content captured in the color video sequence. Concrete use cases for this scenario are a panoramic camera capturing a scene and various depth camera capturing each a part of the scene. Another scenario could be a 360° omnidirectional camera capturing a scene and several 2D depth camera capturing the scene in some directions.

When the auxiliary video sequences are depth video sequences, a similar track referencing mechanism, as described in relation with FIG. 9 can be used with the difference that multiple depth video tracks point to the same primary video track.

In one embodiment of step 120 of method 100 and step 220 of method 200, the alignment status is encapsulated in a box RGBDAlignmentInformationBox as specified in Annex 1.

In one embodiment of step 130 of method 100 and step 230 of method 200, the alignment reference data is encapsulated in a box RGBDAlignmentInformationBox as specified in Annex 2.

In one embodiment of step 140 of method 100 and step 240 of method 200, the overlap status is encapsulated in a box DepthAlignmentInformationBox as specified in Annex 3.

In one embodiment of step 150 and 151 of method 100 and step 250 and 251 of method 200, the resampling and interpolation data are encapsulated in a box DepthAlignmentInformationBox as specified in Annex 4.

In one embodiment of step 160 of method 100 and step 260 of method 200, the overlap status is encapsulated in a box DepthAlignmentInformationBox as specified in Annex 5.

In one embodiment of step 170 of method 100 and step 270 of method 200, illustrated on FIG. 11, a four characters code 'rgbd' signals the brand as part of the "compatible_brands parameter" of the box FileTypeBox 'ftyp' as defined in the standard ISO/IEC 14496-12.

Figure 12:
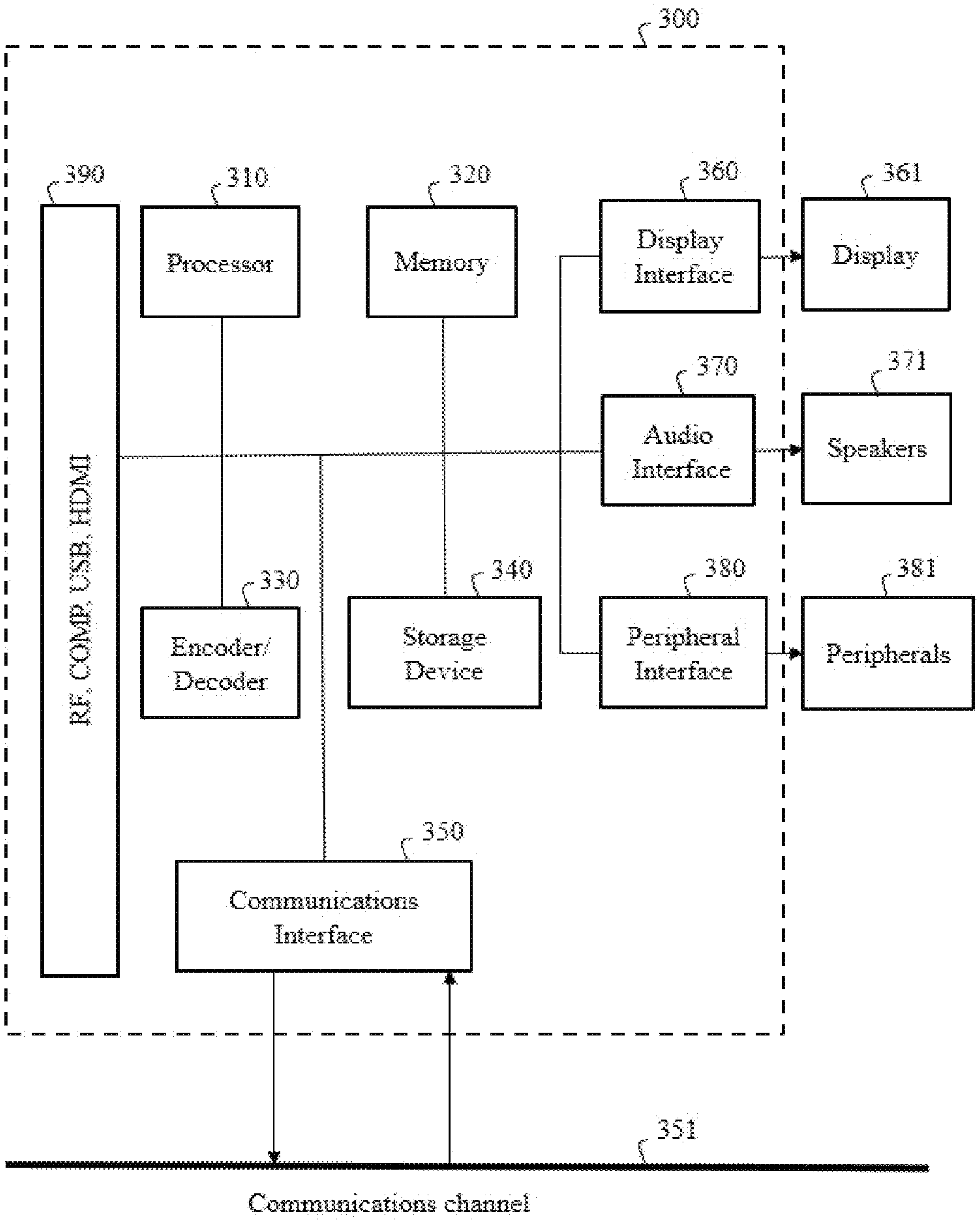
FIG. 12 shows a schematic block diagram illustrating a system in which various aspects and embodiments are implemented.

FIG. 12 shows a schematic block diagram illustrating a system 300 in which various aspects and embodiments are implemented.

System 300 may be embedded as one or more devices including the various components described below. In various embodiments, system 300 may be configured to implement one or more of the aspects described in the present disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, system 300 may be communicatively coupled to other similar systems, or to other electronic devices, via, for example, a communications bus or through dedicated input and/or output ports.

System 300 may include at least one processor 310 configured to execute instructions loaded therein for implementing, for example, the various aspects described in the present disclosure. Processor 310 may include embedded memory, input output interface, and various other circuitries as known in the art. System 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

System 300 may include an encoder/decoder module 330 configured, for example, to process data to provide encoded/decoded video picture data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the present disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the present disclosure. Such stored items may include, but are not limited to video picture data, information data used for encoding/decoding video picture data, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, (iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present disclosure is implemented in the automotive domain.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 351. The communication interface 350 may include, but is not limited to, a transceiver configured to transmit and to receive data over communication channel 351. The communication interface 350 may include, but is not limited to, a modem or network card and the communication channel 351 may be implemented, for example, within a wired and/or a wireless medium.

Data may be streamed to system 300, in various embodiments, using a Wi-Fi network such as IEEE 802.11. The Wi-Fi signal of these embodiments may be received over the communications channel 351 and the communications interface 350 which are adapted for Wi-Fi communications. The communications channel 351 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise a bitstream and/or information such a number of pixels of a video picture, any coding/decoding setup parameters, an alignment status, alignment reference data, overlap status, resampling data, interpolation data, and/or calibration data.

It is to be appreciated that signaling may be accomplished in a variety of ways. For example, one or more syntax elements, flags, and so forth may be used to signal information to a corresponding decoder in various embodiments.

System 300 may provide an output signal to various output devices, including a display 361, speakers 371, and other peripheral devices 381. The other peripheral devices 381 may include, in various examples of embodiments, one or more of a stand-alone DVR, a disk player, a stereo system, a lighting system, and other devices that provide a function based on the output of system 300.

In various embodiments, control signals may be communicated between the system 300 and the display 361, speakers 371, or other peripheral devices 381 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Alternatively, the output devices may be connected to system 300 using the communications channel 351 via the communications interface 350. The display 361 and speakers 371 may be integrated in a single unit with the other components of system 300 in an electronic device such as, for example, a television.

In various embodiments, the display interface 360 may include a display driver, such as, for example, a timing controller (T Con) chip.

The display 361 and speaker 371 may alternatively be separate from one or more of the other components, for example, if the RF portion of input 390 is part of a separate set-top box. In various embodiments in which the display 361 and speakers 371 may be external components, the output signal may be provided via dedicated output connections, including, for example, HDMI ports, USB ports, or COMP outputs.

In FIGS. 1-12, various methods are described herein, and each of the methods includes one or more steps or actions for achieving the described methods. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium, such as storage device 340 (FIG. 12) for instance. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

Annex 1

Annex 1 provides an example of a binary syntax for representing a box RGBDAlignmentInformationBox.

The container RGBDAlignmentInformationBox is an instance of a class inherited from a generic class FullBox defined in clause 4.2.2 Object definitions of the standard ISO/IEC 14496-12. The container C1 is thus a box as defined in the standard ISO/IEC 14496-12.

In this example the alignment state called "image_alignment_status_idc" is an unsigned integer and "reserved" relates to reserved future values.

The binary syntax is the following:

```
aligned(8) class RGBDAlignmentInformationBox( ) extends FullBox
('depa', 0, 0) {
  unsigned int(2) image_alignment_status_idc;
  unsigned int(6) reserved;
}
```

Annex 2

Annex 2 provides another example of a binary syntax for representing a variant of the box RGBDAlignmentInformationBox of Annex 1.

In this example the alignment reference data called "image_alignment_reference_idc" is an unsigned integer and "reserved" relates to reserved future values.

The binary syntax is the following:

```
aligned(8) class RGBDAlignmentInformationBox( ) extends FullBox
(depa', 0, 0) {
  unsigned int(2) image_alignment_status_idc;
  unsigned int(6) reserved;
  if (image_alignment_status_idc == 1) {
    unsigned int(2) image_alignment_reference_idc;
    unsigned int(6) reserved;
}
```

Annex 3

Annex 3 provides an example of a binary syntax for representing a box DepthAlignmentInformationBox. The name of the box refers to a depth video track because the usual use case is to associate a depth video track with a primary video track.

The box DepthAlignmentInformationBox is an instance of a class inherited from a generic class FullBox defined in clause 4.2.2 Object definitions of the standard ISO/IEC 14496-12.

In this example, the first (second) overlap window flag called "depth_overlap_window_flag" ("texture_overlap_window_flag") is an unsigned integer, the window horizontal position called "depth_window_position_h" ("texture_window_position_h") is an unsigned integer, the window vertical position called "depth_window_position_v" ("texture_window_position_v") is an unsigned integer, the window width called "depth_window_width" ("texture_window_width") is an unsigned integer, the window height called "depth_window_height" ("texture_window_height"), the window position horizontal offset called "depth_window_position_offset_h" ("texture_window_position_offset_h") is an unsigned integer, the window position vertical offset called "depth_window_position_offset_v" ("texture_window_position_offset_v") is an unsigned integer and "reserved" relates to reserved future values.

The binary syntax is the following:

```
aligned(8) class DepthAlignmentInformationBox( ) extends FullBox
(depa', 0, 0)
{
  unsigned int(2) image_alignment_status_idc;
  unsigned int(6) reserved;
  if (image_alignment_status_idc == 1) {
    unsigned int(2) image_alignment_reference_idc;
    unsigned int(1) depth_overlap_window_flag;
    unsigned int(1) texture_overlap_window_flag;
    unsigned int(4) reserved;
    if (depth_overlap_window_flag == 1) {
      unsigned int(32) depth_window_position_h;
      unsigned int(32) depth_window_position_v;
      unsigned int(16) depth_window_position_offset_h;
      unsigned int(16) depth_window_position_offset_v;
      unsigned int(32) depth_window_width;
      unsigned int(32) depth_window_height;
    }
    if (texture_overlap_window_flag == 1) {
      unsigned int(32) texture_window_position_h;
      unsigned int(32) texture_window_position_v;
      unsigned int(16) texture_window_position_offset_h;
      unsigned int(16) texture_window_position_offset_v;
      unsigned int(32) texture_window_width;
      unsigned int(32) texture_window_height;
    }
  }
}
```

When no overlap window is signaled for either the auxiliary or the primary video track, the alignment is expressed for the entire frame.

Figure 10:
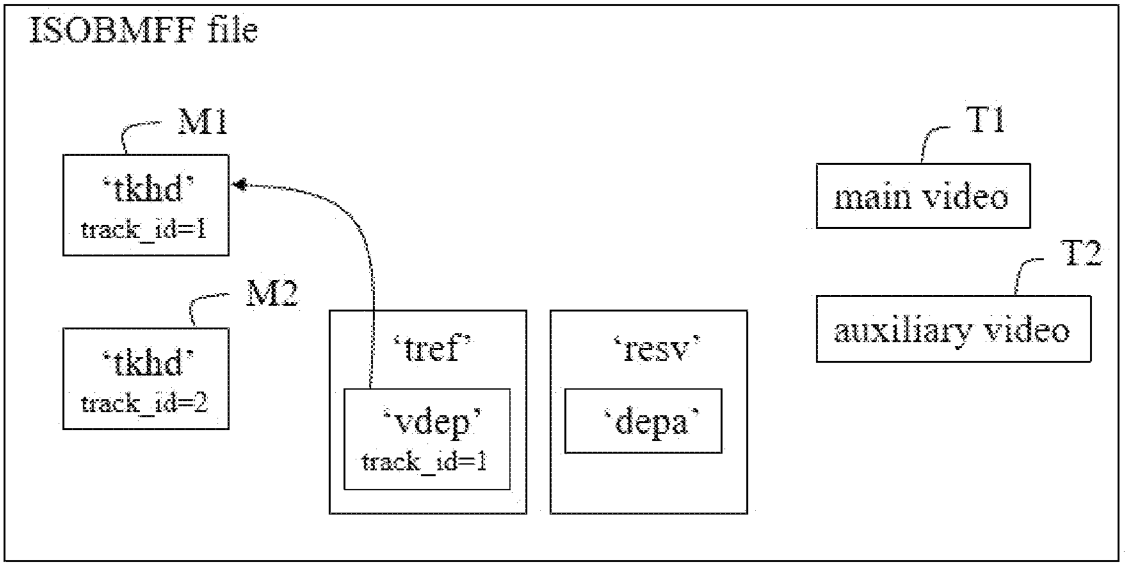
FIG. 10 shows an encapsulation of a single primary video sequence associated with a single auxiliary video sequence into an ISOBMFF file in accordance with an embodiment of the present disclosure.

There may be several places in an ISOBMFF where such a box could be placed but a desirable approach to keep the solution codec-agnostic and leave the main video (texture video) accessible to legacy devices is to define a restricted scheme of type 'depa' for the auxiliary video track and place the new box inside the restricted scheme video box ('resv') as illustrated on FIG. 10. This way, it also makes the auxiliary video track appear as "special" and legacy devices that would not recognize this restricted scheme would ignore the depth video track and only process the primary video track.

Annex 4

Annex 4 provides an example of a binary syntax for representing a variant of the box DepthAlignmentInformationBox of Annex 3.

In this example, the image resampling data called "image_to_be_resampled" is an unsigned integer, the interpolating data called "interpolation_method" is an unsigned integer.

```
aligned(8) class DepthAlignmentInformationBox( ) extends FullBox
('depa', 0, 0) {
  unsigned int(2) image_alignment_status_idc;
  unsigned int(6) reserved;
```

-continued

```
... (other parameters such as presented earlier may be present, removed
clarity)
  if (image__alignment__status__idc == 1) {
     unsigned int(3) image__to__be__resampled;
     unsigned int(5) interpolation__method;
  }
}
```

Annex 5

Annex 5 provides an example of a binary syntax for representing the variant of box DepthAlignmentInformationBox of Annex 3 or 4.

In this example, the calibration file format called "calibration_file_format_uri" is an utf8string, and the string representing the calibration file is an utf8string allowing access to the calibration file.

```
aligned(8) class DepthAlignmentInformationBox( ) extends FullBox
('depa', 0, 0) {
  ... (other parameters such as presented earlier may be present, removed
  clarity)
  utf8string calibration__file__format__uri;
  utf8string calibration__file;
}
```

As will be apparent to one of ordinary skill in the art based on the present disclosure, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present disclosure. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout the present disclosure are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the present disclosure are not necessarily all referring to the same embodiment/example/implementation, nor are separate or alternative embodiments/examples/implementations necessarily mutually exclusive of other embodiments/examples/implementations.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video sequence (including possibly a received bitstream which encodes one or more video sequences) in order to produce a final output suitable for display or for further processing in the reconstructed video domain. In various embodiments, such processes include one or more of the processes typically performed by a decoder. In various embodiments, such processes also, or alternatively, include processes performed by a decoder of various implementations described in the present disclosure.

As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present disclosure may encompass all or part of the processes performed, for example, on an input video sequence in order to produce an output bitstream. In various embodiments, such processes include one or more of the processes typically performed by an encoder. In various embodiments, such processes also, or alternatively, include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present disclosure may refer to "obtaining" various pieces of information. Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain embodiments the encoder signals a particular information such as coding parameter or encoded video picture data. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of signaling encapsulated data representing a primary video sequence associated with an auxiliary video sequence, the primary and auxiliary video sequences resulting from image projections methods applied on signals captured by sensors, the method comprising:

writing visual contents of the primary and auxiliary video sequences as encapsulated data;

writing an alignment status as encapsulated data, the alignment status indicating whether the visual contents of the primary and auxiliary video sequences are aligned; and writing an overlap status as encapsulated data, the overlap status indicating whether the visual content of the primary and the visual content of the auxiliary video sequences fully overlap or partially overlap.

2. The method of claim 1, wherein the alignment status further indicates one of the following statuses:

there is no alignment between the visual content of the primary video sequence and the visual content of the auxiliary video sequence;

the primary video sequence and the auxiliary video sequence have been produced from a same image projection method but samples of their video frames are not aligned;

there is one-to-one alignment between the samples of video frames of the primary video sequence and the samples of the video frames of the auxiliary video sequence; or alignment between the visual content of the primary video sequence and the visual content of the auxiliary video sequence is unspecified.

3. The method of claim 2, wherein when the alignment status indicates that the primary video sequence and the auxiliary video sequence have been produced from a same image projection method but samples of their video frames are not aligned, the method further comprises writing an alignment reference data as encapsulated data, the alignment reference data indicating either the samples of video frames of the auxiliary video sequence have been aligned on the samples of video frames of the primary video sequence or inversely.

4. The method of claim 1, wherein writing the overlap status as encapsulated data comprises:

for the alignment status indicating that the visual contents of the primary and auxiliary video sequences are aligned, writing the overlap status as encapsulated data.

5. The method of claim 4, wherein the overlap status further indicates:

a first overlap window flag that indicates the presence of an explicit overlap window within the video frames of the auxiliary video sequence that align with the video frames of the primary video sequence; and a second overlap window flag that indicates the presence of an explicit overlap window within the video frames of the primary video sequence that align with the video frames of the auxiliary video sequence.

6. The method of claim 5, wherein in a case that the first or second overlap window flag indicates the presence of an explicit overlap window, the overlap status further indicates:

a window horizontal position that specifies the horizontal position of a top left corner of the overlap window;

a window vertical position that specifies the horizontal position of the top left corner of the overlap window;

a window width that specifies the horizontal dimension of the top left corner of the overlap window;

a window height that specifies the horizontal dimension of the top left corner of the overlap window;

a window position horizontal offset that specifies a position horizontal offset of the top left corner of the overlap window; and a window position vertical offset that specifies a position vertical offset of the top left corner of the overlap window.

7. The method of claim 5, wherein in a case that the first and second overlap window flags indicate the presence of explicit overlap windows, the overlap status indicates a window horizontal position, a window vertical position, a window width, a window height, a window position horizontal offset and a window position vertical offset for each overlap window.

8. The method of claim 7, wherein when the primary and auxiliary video sequence have different dimensions or the overlap windows have different dimensions, the method further comprises writing a resampling data as encapsulated data, the resampling data indicating how an application re-samples the video frames of either the auxiliary or primary video sequence to the dimensions of the video frames of either the primary or auxiliary video sequence.

9. The method of claim 8, further comprising:

writing an interpolation data as encapsulated data, the interpolation data indicating an interpolation method used to resampling samples of video frames of a video sequence, wherein the interpolating data represents coefficients of a resampling filter to be applied to the samples of video frames of a video sequence.

10. An apparatus of signaling encapsulated data representing a primary video sequence associated with an auxiliary video sequence, the primary and auxiliary video sequences resulting from image projections methods applied on signals captured by sensors, the apparatus comprising:

a processor; and a memory storing instructions executable by the processor, wherein the processor is configured to:

write visual contents of the primary and auxiliary video sequences as encapsulated data;

write an alignment status as encapsulated data, the alignment status indicating whether the visual contents of the primary and auxiliary video sequences are aligned; and write an overlap status as encapsulated data, the overlap status indicating whether the visual content of the primary and the visual content of the auxiliary video sequences fully overlap or partially overlap.

11. A method of parsing encapsulated data representing a primary video sequence associated with an auxiliary video sequence, the primary and auxiliary video sequences resulting from image projections methods applied on signals captured by sensors, the method comprising:

obtaining visual contents of the primary and auxiliary video sequences by parsing encapsulated data;

obtaining an alignment status by parsing encapsulated data, the alignment status indicating whether the visual contents of the primary and auxiliary video sequences are aligned; and obtaining an overlap status by parsing encapsulated data, the overlap status indicating whether the visual content of the primary and the visual content of the auxiliary video sequences fully overlap or partially overlap.

12. The method of claim 11, wherein the alignment status further indicates one of the following statuses:

there is no alignment between the visual content of the primary video sequence and the visual content of the auxiliary video sequence;

the primary video sequence and the auxiliary video sequence have been produced from a same image projection method but samples of their video frames are not aligned;

there is one-to-one alignment between the samples of video frames of the primary video sequence and the samples of the video frames of the auxiliary video sequence; or alignment between the visual content of the primary video sequence and the visual content of the auxiliary video sequence is unspecified.

13. The method of claim 12, wherein when the alignment status indicates that the primary video sequence and the auxiliary video sequence have been produced from a same image projection method but samples of their video frames are not aligned, the method further comprises obtaining an alignment reference data by parsing encapsulated data, the alignment reference data indicating either the samples of video frames of the auxiliary video sequence have been aligned on the samples of video frames of the primary video sequence or inversely.

14. The method of claim 11, wherein obtaining the overlap status by parsing encapsulated data comprises:

for the alignment status indicating that the visual contents of the primary and auxiliary video sequences are aligned, obtaining the overlap status by parsing encapsulated data.

15. The method of claim 14, wherein the overlap status further indicates:

a first overlap window flag that indicates the presence of an explicit overlap window within the video frames of the auxiliary video sequence that align with the video frames of the primary video sequence; and a second overlap window flag that indicates the presence of an explicit overlap window within the video frames of the primary video sequence that align with the video frames of the auxiliary video sequence.

16. The method of claim 15, wherein in a case that the first or second overlap window flag indicates the presence of an explicit overlap window, the overlap status further indicates:

a window horizontal position that specifies the horizontal position of a top left corner of the overlap window;

a window vertical position that specifies the horizontal position of the top left corner of the overlap window;

a window width that specifies the horizontal dimension of the top left corner of the overlap window;

a window height that specifies the horizontal dimension of the top left corner of the overlap window;

a window position horizontal offset that specifies a position horizontal offset of the top left corner of the overlap window; and a window position vertical offset that specifies a position vertical offset of the top left corner of the overlap window.

17. The method of claim 15, wherein in a case that the first and second overlap window flags indicate the presence of explicit overlap windows, the overlap status indicates a window horizontal position, a window vertical position, a window width, a window height, a window position horizontal offset and a window position vertical offset for each overlap window.

18. The method of claim 17, wherein when the primary and auxiliary video sequence have different dimensions or the overlap windows have different dimensions, the method further comprises obtaining a resampling data by parsing encapsulated data, the resampling data indicating how an application re-samples the video frames of either the auxiliary or primary video sequence to the dimensions of the video frames of either the primary or auxiliary video sequence.

19. The method of claim 18, further comprising:

obtaining an interpolation data by parsing encapsulated data, the interpolation data indicating an interpolation method used to resampling samples of video frames of a video sequence, wherein the interpolating data may represent coefficients of a resampling filter to be applied to the samples of video frames of a video sequence.

20. An apparatus of parsing encapsulated data representing a primary video sequence associated with an auxiliary video sequence, the primary and auxiliary video sequences resulting from image projections methods applied on signals captured by sensors, the apparatus comprising:

a processor; and a memory storing instructions executable by the processor, wherein the processor is configured to perform the method of claim 11.

* * * * *